J. WEIDEMAN.
Fanning Mill.
No. 7,405.
Patented May 28, 1850.
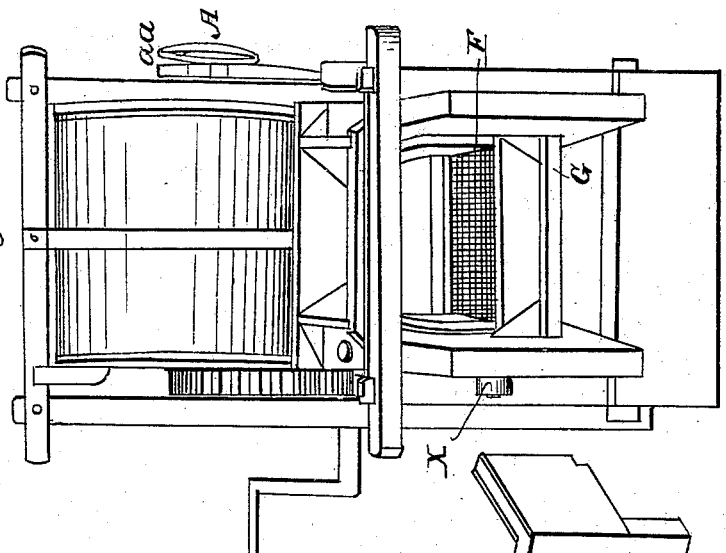
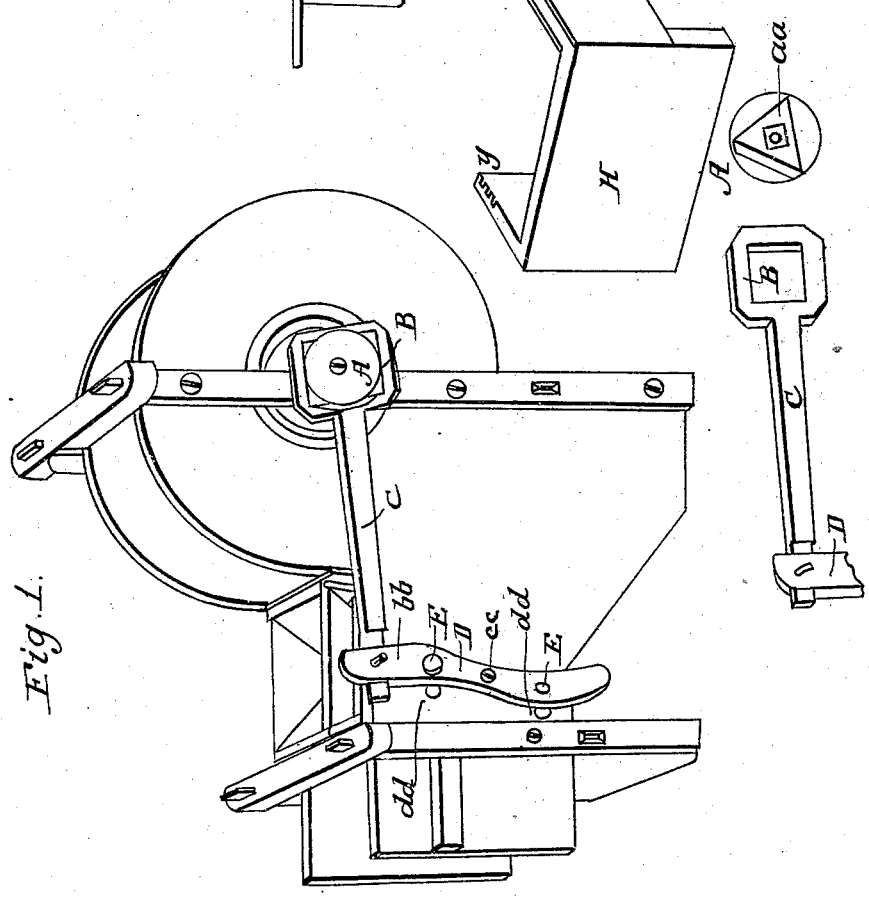

UNITED STATES PATENT OFFICE.

JOHN WEIDMAN, OF LITTLESTOWN, PENNSYLVANIA.

FANNING-MILL.

Specification of Letters Patent No. 7,405, dated May 28, 1850.

*To all whom it may concern:*

Be it known that I, JOHN WEIDMAN, of Littlestown, in the county of Adams and State of Pennsylvania, have invented a new and useful Improvements in Winnowing Mills; and I do hereby declare that the following is a full and exact description thereof, reference being had to the annexed drawings, making a part of this specification, in which—

Figure I, is a side view of a winnowing mill with my improvements, Fig. II, an end view of the same and figures marked A and B, detached parts of the shaker and H an adjustable tail board.

The nature of my invention consists in an improved construction and arrangement for operating the sieves in the winnowing mill by which the shaking operation is more effectually accomplished—and thereby more grain is cleaned and better cleaned, in the same time, than by any of the known modes—and an improved adjustable tailboard for separating the grain and chaff.

To enable others skilled in the art, to make and use my invention, I will proceed to describe its construction and operation.

I construct my winnowing mill with the feeding hopper lower than the center of the fan-box. I construct the shaft of the fans so that the opposite end from the crank or handle, projects beyond the frame in which it is inserted; and on this end I place a double solid metal wheel (A,) the outer half of which is circular, and the inner half (*a, a,*) is in the form of a triangle. This triangular half works in a four square ring or box (B,) having an arm (C,) connected (by a pin *b, b,*) with and working a lever (D,) having as its fulcrum a centerpin (*c, c,*) by which it is secured to the side of the mill. Into this lever, on either side of its fulcrum, are inserted the ends of two levers (E, E,) which extend across the chamber under the hopper, and are let into the opposite side, and have their fulcra there, upon these levers, as shoes, are placed the sieves (F, and G,) seen in Fig. II. In that side of the chamber under the hopper next to the lever D, are holes or openings (*d, d,*) to allow the levers (E, E,) to move freely back and forward as they are driven by the lever (D.)

The lever E or shoe of the upper sieve (E,) is or can be farther from the fulcrum (*c c*) of the lever (D,) than the shoe of the lower sieve (G,) and thus its stroke be greater than that of the lower lever or shoe. The upper sieve may be coarse and has a downward inclination rearward and thus the large sound grain is permitted to pass through, but not the heads &c., which are thrown off. The lower sieve may be fine. It has its depression forward. Thus the cockle and other small seeds are permitted to pass through, and the good grain is carried out in front.

The operation will at once be perceived. By the turning of the crank or handle connected with the shaft of the fans, (as in common mills) revolution is given to the double solid wheel (A *a, a,*)—and the triangle (*a, a,*) working in the four square box or ring (B,) propels and at the same time shakes the arm (C,) and by means of it the lever (D,), thus driving and shaking the levers (E, E,) and operating the sieves (F and G.)

By means of this construction and arrangement there are three strokes given to the lever (D,) and by it to the levers or shoes (E, E,) where but one is given by shakers propelled by a crank in any of the known modes. The upper shoe being farther from the fulcrum, its sieve is more violently shaken than the lower.

The sieves can be much broader than in ordinary mills having shakers with a lateral motion, and thus a larger amount of grain can be cleaned in the same time. The shaking operation is better, and thus the grain can be more perfectly cleaned.

The feeding hopper being lower than the fan box, need not be higher than two feet nine inches from the floor, and thus the machine is rendered very convenient.

Instead of the fixed tailboard I substitute an upright adjustable tailboard (H,) which can be moved backward and forward and adapted exactly to the strength of the wind, and the weight of the grain, and by means of a click or fixture (*x*) can be fastened when adjusted as desired. For this purpose, notches (*y, y,*) are made in the upper part of the adjustable tailboard. The refuse grain can thus be much more effectually separated from the chaff by this tailboard which extends to the floor than in the old mode and can be easily gathered up and cleaned over.

What I claim as my invention and desire to secure by Letters Patent is

My improved construction and arrangement for shaking and operating the sieves in a winnowing mill, in the manner herein described.

JOHN WEIDMAN.

Witnesses:
D. McConaugh,
T. B. Danner.